United States Patent
Russo (10) Patent No.: US 7,486,282 B2
(45) Date of Patent: Feb. 3, 2009

(54) SIZE VARIANT PRESSURE ERASER

(75) Inventor: Thomas P. Russo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 11/340,743

(22) Filed: Jan. 27, 2006

(65) Prior Publication Data

US 2007/0176904 A1 Aug. 2, 2007

(51) Int. Cl.
*G06F 3/033* (2006.01)

(52) U.S. Cl. .................... 345/179; 345/156; 345/173; 178/19.01; 178/19.04

(58) Field of Classification Search ............... 345/156, 345/173, 179; 178/18.01, 18.03, 19.01, 19.04
See application file for complete search history.

(56) References Cited

U.S. PATENT DOCUMENTS

| | | | |
|---|---|---|---|
| 4,633,436 A | 12/1986 | Flurry | |
| 4,777,329 A | 10/1988 | Mallicoat | |
| 4,992,630 A * | 2/1991 | Mletzko | 178/19.04 |
| 5,248,856 A | 9/1993 | Mallicoat | |
| 5,434,959 A * | 7/1995 | Von Ehr et al. | 345/441 |
| 5,475,401 A * | 12/1995 | Verrier et al. | 345/179 |
| 6,111,565 A * | 8/2000 | Chery et al. | 345/179 |
| 6,118,437 A | 9/2000 | Fleck et al. | |
| 6,300,580 B1 | 10/2001 | Shenholz et al. | |
| 6,310,615 B1 | 10/2001 | Davis et al. | |
| 6,667,739 B2 | 12/2003 | Atwood et al. | |
| 6,707,473 B2 * | 3/2004 | Dresevic et al. | 715/768 |
| 6,730,862 B1 | 5/2004 | Gasparik | |
| 6,909,430 B2 * | 6/2005 | Dresevic et al. | 345/443 |
| 7,190,375 B2 * | 3/2007 | Dresevic et al. | 345/611 |
| 2005/0052433 A1 * | 3/2005 | Silverman et al. | 345/179 |
| 2005/0088426 A1 * | 4/2005 | Smirnov et al. | 345/179 |
| 2005/0093836 A1 * | 5/2005 | Dodge et al. | 345/179 |

FOREIGN PATENT DOCUMENTS

| | | |
|---|---|---|
| EP | 0 591 083 | 4/1994 |
| GB | 783732 | 9/1957 |

OTHER PUBLICATIONS http://delivery.acm.org/10.1145/1060000/1055036/p461-li.pdf?key1=1055036&key2=8105393311&coll=GUIDE&di=GUIDE&CFID=59486863&cftoken=94908750 Experimental Analysis of Mode Switching Techniques in Pen-based User Interfaces, 10 pages, 2005.

http://www.csis.pace.edu/-ctappert/dps/pdf/pen-tapert.pdf, The State of the Art in On-Line Handwriting Recognition, vol. 12, No. 8, Aug. 1990.

http://www.csc.com/aboutus/lef.mds67_off/uploads/CSCPaper2005_TabletPC.pdf, Tablet PC Product Summary, pp. 1-40, 2005.

* cited by examiner

*Primary Examiner*—My-Chau T Tran
(74) *Attorney, Agent, or Firm*—Amin, Turocy & Calvin, LLP (57) ABSTRACT

A method of adjusting the size of an area to be deleted in a pen-based computing system is provided. An electronic pen may include an eraser end. The eraser end may be used to contact the display surface of a computer system. Application of pressure to the display through the eraser end of the electronic pen may result in the deletion of the text indicated by the position of the electronic pen. As additional pressure is applied, the size of the area to be deleted increases. The invention provided may be used with both pixel type and stroke type erasing systems and provides an efficient and accurate method of deleting electronic ink.

20 Claims, 7 Drawing Sheets

SIZE VARIANT PRESSURE ERASER

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the WINDOWS® computer operating system (available from Microsoft Corporation of Redmond, Wash.). The ubiquitous keyboard and mouse interface provides for fast creation and modification of documents, spreadsheets, database fields, drawings, photos, webpages, and the like.

Recently, however, pen-based computing systems, such as tablet PCs, personal digital assistants, and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

As pen based computing systems become more popular, users are increasingly entering more data in the form of electronic ink. As with any computer input device, errors are possible and corrections must be made. The ability to erase electronic ink from the user interface is necessary and the ability to use the electronic pen to erase this ink can be highly efficient.

SUMMARY

The present invention relates to systems and methods of erasing electronic ink from a computer system display. In one example, an electronic pen or stylus includes an eraser end and a writing end. The eraser end may be used to contact the display surface. As pressure is applied to the surface, the electronic ink indicated by the position of the pen may be erased. As the applied pressure increases, a larger area of electronic ink may be deleted (e.g., a wider erasure path may be provided).

BRIEF DESCRIPTION OF THE DRAWINGS

The present invention is illustrated by way of example and not limited in the accompanying figures in which like reference numerals indicate similar elements and in which.

DETAILED DESCRIPTION

The present invention relates to user interfaces, systems, methods and computer-readable media for processing electronic data and interacting with electronic text in pen-based computing systems. In general, aspects of the invention relate to user interfaces, displayable by an appropriate display device and activated by an electronic pen, that may be used for deleting or erasing electronic text or ink and/or otherwise interacting with electronic text or ink using pen input in pen-based computing systems. Such interfaces may include: (a) a display portion that displays an original text (e.g., electronic ink, machine-generated text provided by a handwriting recognition engine or some other source, etc.); (b) an electronic pen having an eraser end; and (c) a correction or erasure mechanism that the user may activate by contacting the eraser end of the electronic pen to the display portion displaying the electronic ink or text. Aspects of this invention also relate to systems, methods and computer-readable media for operating and/or interacting with user interfaces of the types described above.

Figure 1:
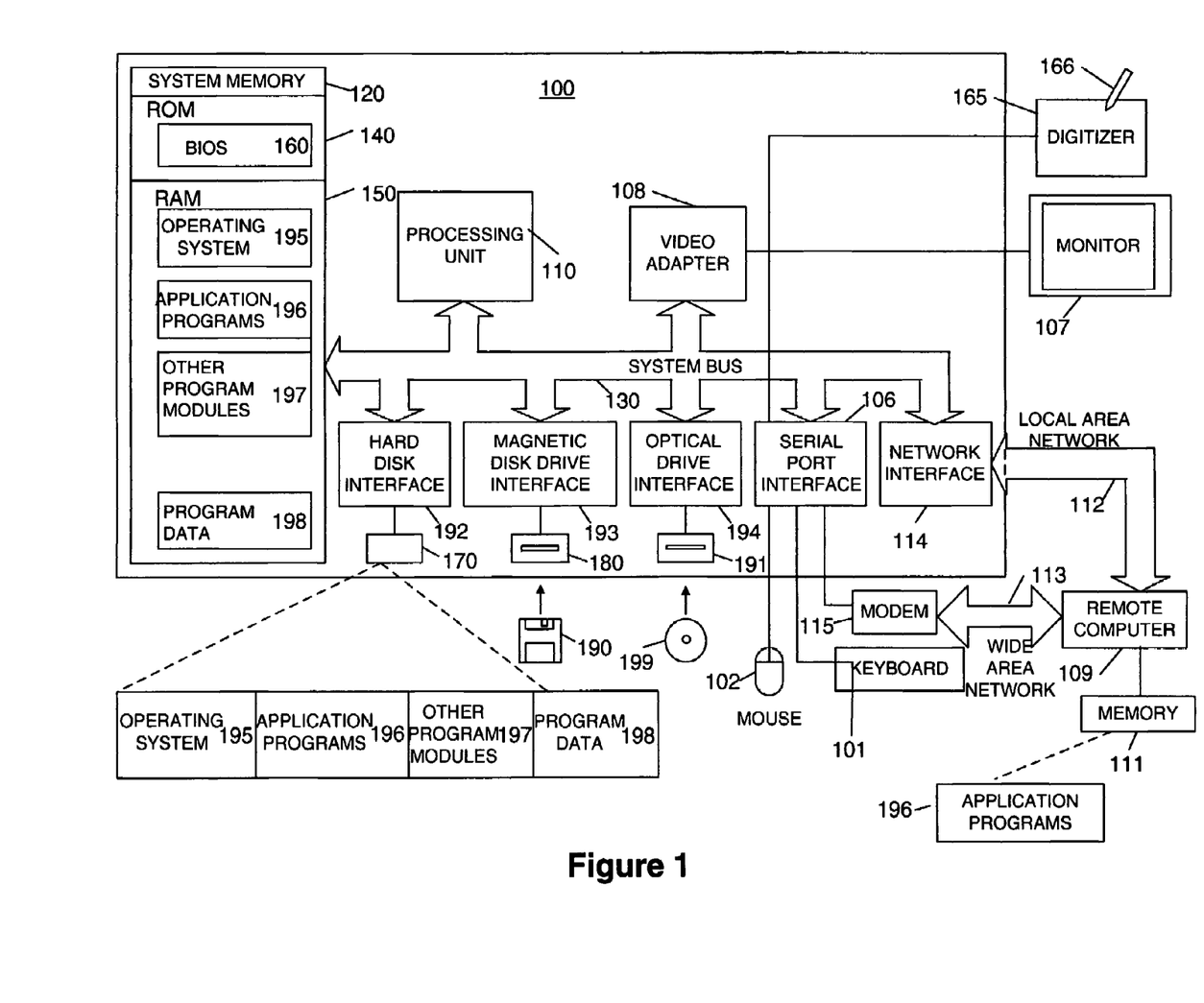
FIG. 1 illustrates a schematic diagram of a general-purpose digital computing environment in which certain aspects of the present invention may be implemented.

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In some example environments, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill. Additional elements, devices or subsystems also may be included in the computer system without departing from this invention.

Figure 2:
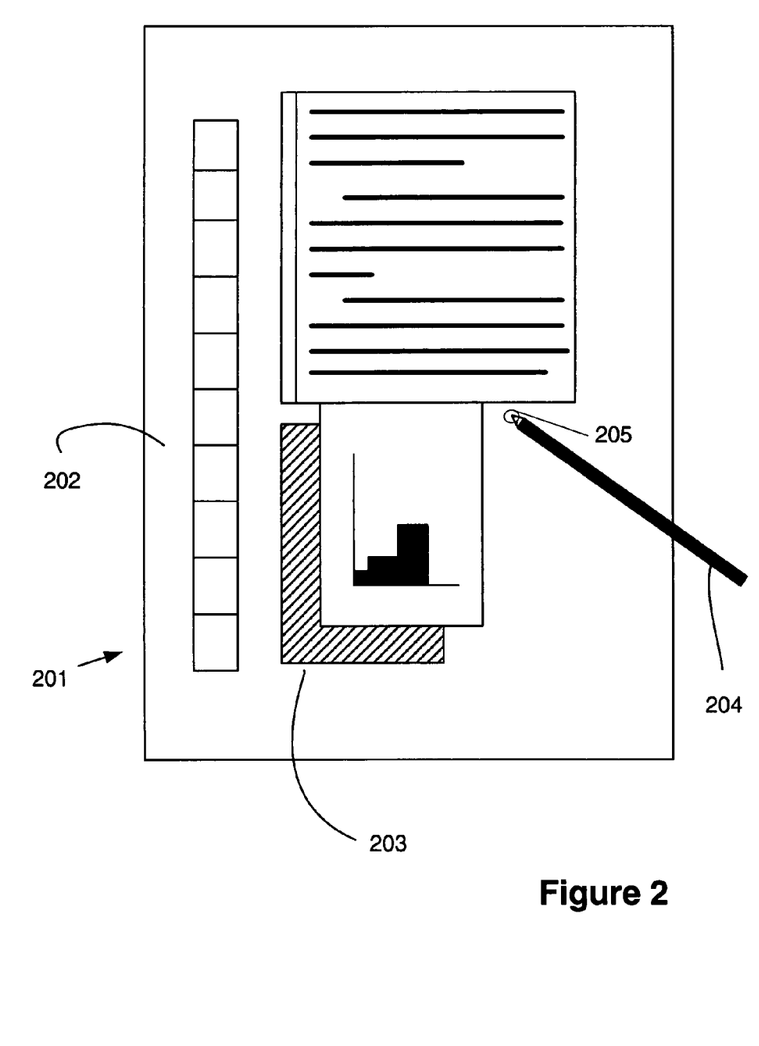
FIG. 2 illustrates a pen based personal computing environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using a stylus, or electronic pen 204, a user can select, highlight, and write on the digitizing display area and thereby enter electronic ink data into the system. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons, pressure sensing capabilities or other features to augment its capabilities. In one example, a stylus 204 could be implemented as a "pencil" or "pen," in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an operating system and/or an application program can use to capture, manipulate, and store ink and/or other pen actions or events. The ink platform also may include a mark-up language including a language like the extensible markup language (XML). Additional examples of the ink platform may use the DCOM (distributed component object model) implementation. Yet further implementations may be used including the Win32 programming model and the .Net programming model from Microsoft Corporation. These platforms are commercially available and known in the art.

In addition to use with full performance pen-based computing systems or "tablet PCs"(e.g., convertible laptops or "slate" type tablet PCs), aspects of this invention can be used in conjunction with other types of pen-based computing systems and/or other devices that accept data as electronic ink and/or that accept, process, or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus or that can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

As described above, aspects of the present invention relate generally to user interfaces, systems, and methods for interacting with and processing electronic ink using pen-based computing systems and other computing systems using a pen as an input device. In conventional computer systems that include a mouse (or some other pointing device) and/or a keyboard, editing machine-generated text is relatively easy and quick, and such systems and methods are very familiar to users. With the growing popularity of pen-based computing systems, however, these conventional hardware based editing tools are not always available to or preferred by users, particularly for users that input much or all data and/or fully control the computer's user interface and operating system using only a pen. While in some instances a user can call up and use a soft keyboard and the pen to edit and/or enter machine-generated text, doing so can be slow, cumbersome, and frustrating, particularly when a large amount of text must be entered, reviewed and/or edited.

In some exemplary pen-based computer systems, an electronic pen may be used that has an eraser end opposite the writing end of the pen. As discussed above, the eraser end may contact the digitizer and move across the display to indicate portions of the electronic ink on the display to be erased. In general, in accordance with aspects of the invention, there are at least two types of erasing systems that may be used with pen-based computing systems. The first is a "pixel" eraser system in which the eraser end of the pen is put in contact with the displayed electronic ink and the pixels of electronic ink covered by or contacted by the area of the eraser will be deleted (e.g., changed, in color, to correspond to the background color of the document in that area). The second type of erasing system is a "stroke" eraser system. In using a stroke eraser, all of the pixels of any electronic ink stroke contacted with the area of the eraser end will be deleted (e.g., changed, in color, to correspond to the background color of the document in that area).

The electronic ink eraser according to at least some examples of the present invention may constitute the non-writing end of the electronic pen included with the pen based computing system. As the pen is being used, a user wishing to erase or delete some or all of the electronic ink displayed may reverse the pen in his or her hand and use the non-writing end as an eraser, similar to the action a user would take when using a conventional pencil. Of course, if desired, a separate eraser device may be provided independent of the electronic pen, without departing from the invention. As still another example, if desired, the same end of the pen may be used as an eraser as is used for entering ink, e.g., after selecting an erase mode from a menu or toolbar, by activating an "erase" switch or button on the stylus or computer, etc.

To erase the electronic ink, the user may contact the eraser end of the pen to the display surface of the notebook computer. As the user applies a force having a component that is substantially perpendicular to the display surface and moves the eraser, the electronic ink beneath the eraser end of the pen during its movement, will be deleted. The user may move the eraser end of the pen across any desired ink to be deleted, thereby erasing the pixels that are contacted by the eraser end. In erasing the pixels, the color of each pixel may be changed to a background color at that portion of the document thereby giving the appearance of the ink having been erased. Once the user has reached the end of the ink to be deleted, the force applied to the display surface is removed and no additional ink will be erased.

A predetermined amount of pressure applied to the display by the pen may erase one area of ink that is a predetermined width. The eraser systems and methods according to the present invention allow the user to erase wider swaths of ink by increasing the pressure applied to the display surface (and vice versa). Generally, in accordance with at least some examples of the invention, the width of ink to be erased will increase proportionally with the amount of pressure applied to the digitizer surface by the eraser. For instance, as more pressure is applied to the display, the size of the area to be erased increases (e.g., the eraser path width will be widened). This allows a user to erase greater amounts of ink in a single stroke of the eraser, if desired. In one example, the width of the ink to be erased may increase linearly with increased pressure. In another example, the width of the ink to be erased may increase exponentially or logarithmically as pressure increases.

Figure 3A:
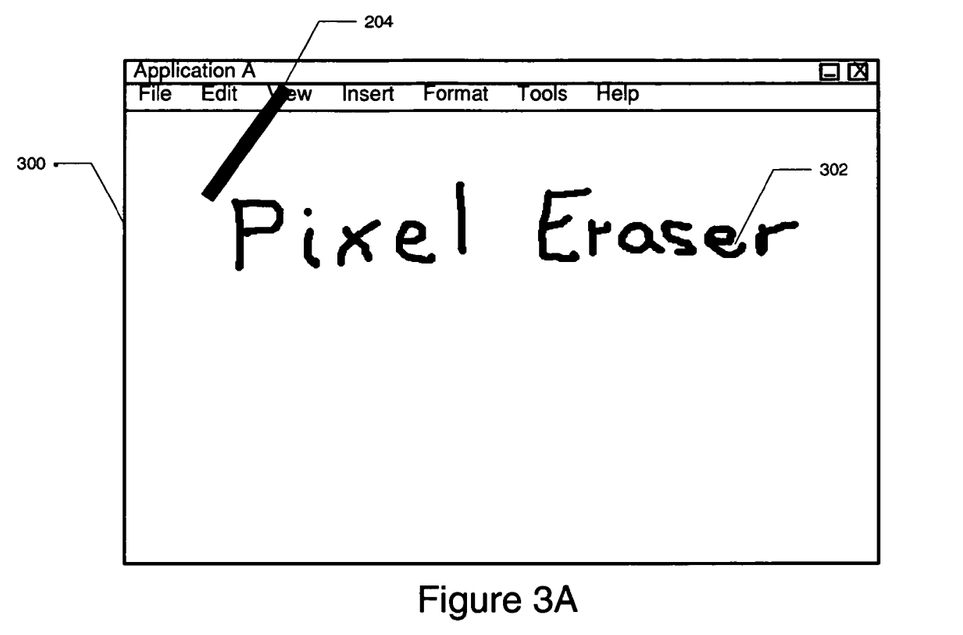
FIGS. 3A-3C illustrate one example of systems, methods and user interfaces according to the present invention in which electronic ink is deleted with a pixel type eraser.
Figure 3B:
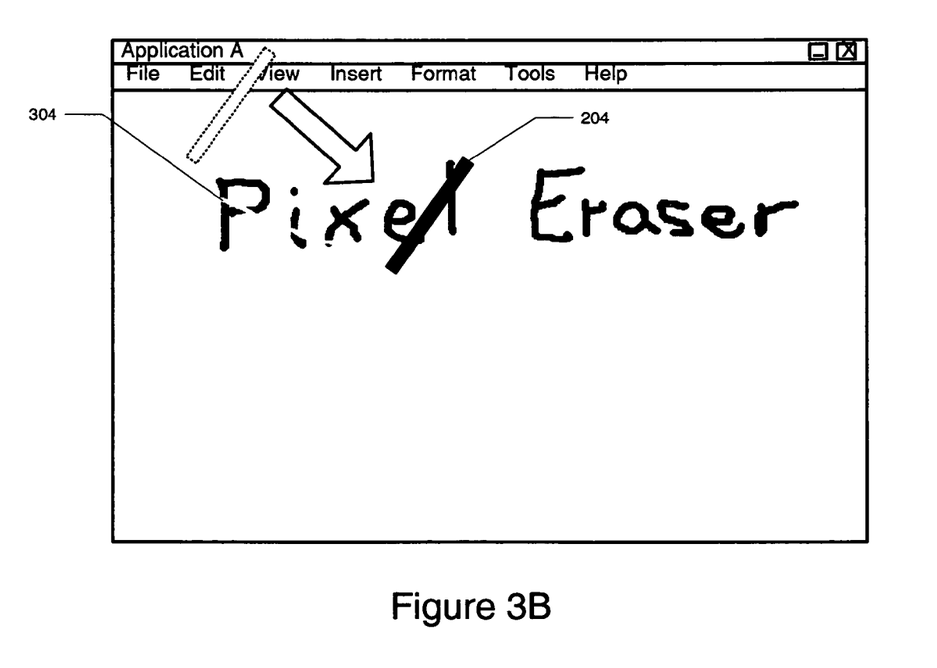
Figure 3C:
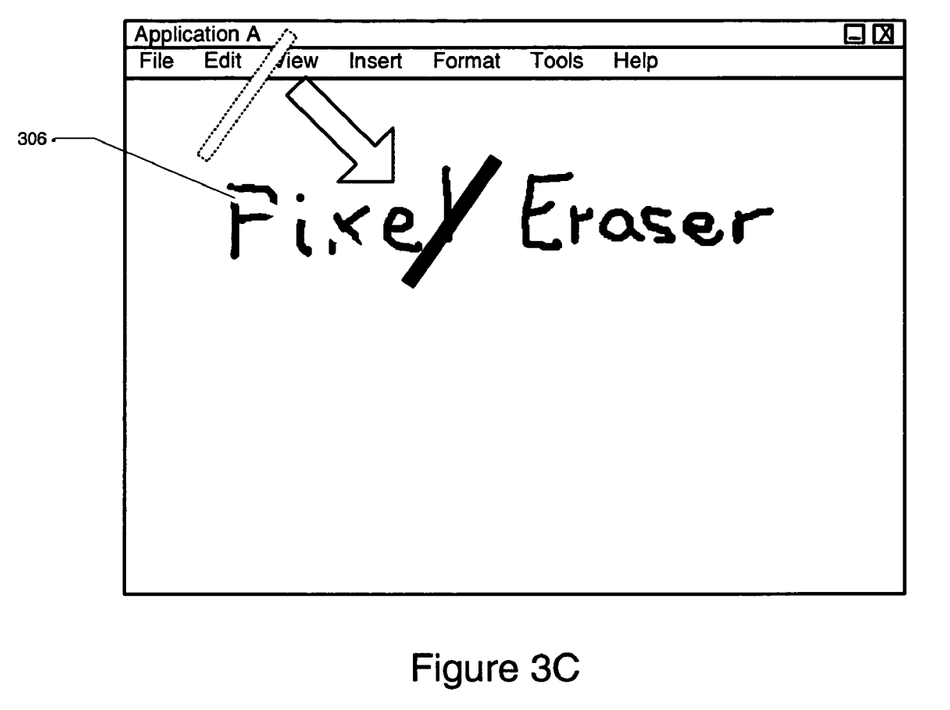

As applied to a pixel type erasing system, the increased pressure will increase the size of the area of the eraser (or the eraser's path width). Pixels of ink located beneath the widened area of the eraser will be erased. Additional ink beyond the widened eraser area may not be deleted. FIGS. 3A-3C depict aspects of the present invention in the form of a pixel type eraser.

FIG. 3A depicts a user interface 300 with a block of electronic ink 302. The pen 204 is positioned at a point where the erasure may begin. As the pen 204 moves across the interface 300, over the electronic ink, the pixels under the area of the eraser are changed to a background color, giving the appearance of the ink having been erased, as seen in FIG. 3B.

With further reference to FIG. 3B, a relatively light pressure was applied to the display surface via the pen 204 in this example. This light pressure erased a relatively narrow portion of the electronic ink 304 (e.g., produced a narrow erased path). FIG. 3C depicts an example in which the electronic ink was erased under an additional or heavier pressure than that shown in FIG. 3B. As more pressure is applied, a wider portion or path of electronic ink 306 may be erased.

When utilized as a stroke type eraser, the increased pressure exerted by the eraser will again increase the area to be deleted. Any ink stroke within the widened area of deletion will be erased, that is, the pixels of the entire stroke having one or more pixels contacted by the eraser, may be changed to a background color to give the appearance of the ink corresponding to that stroke having been erased. In other words, a stroke may begin or have some portion within the area of deletion (e.g., the contact end of the eraser) but end or have some portions outside of it. With a stroke type eraser, the entire stroke would be deleted, including the portion found outside the area of contact with the eraser, provided the eraser contacts at least one pixel contained in the stroke.

Figure 4A:
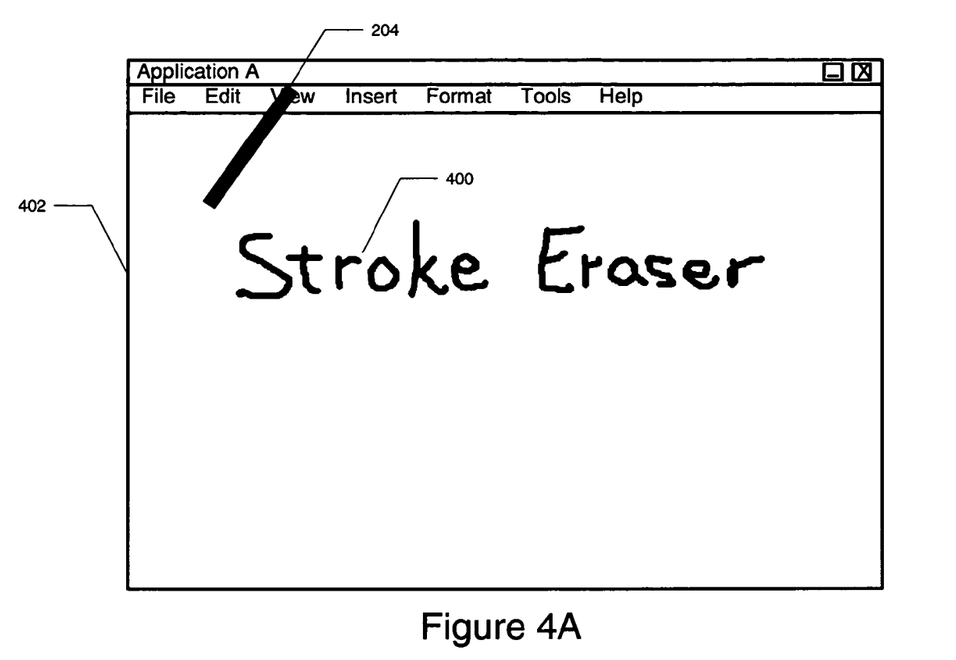
FIGS. 4A-4E illustrate another example of systems, methods and user interfaces according to the present invention in which electronic ink is deleted with a stroke type eraser.
Figure 4B:
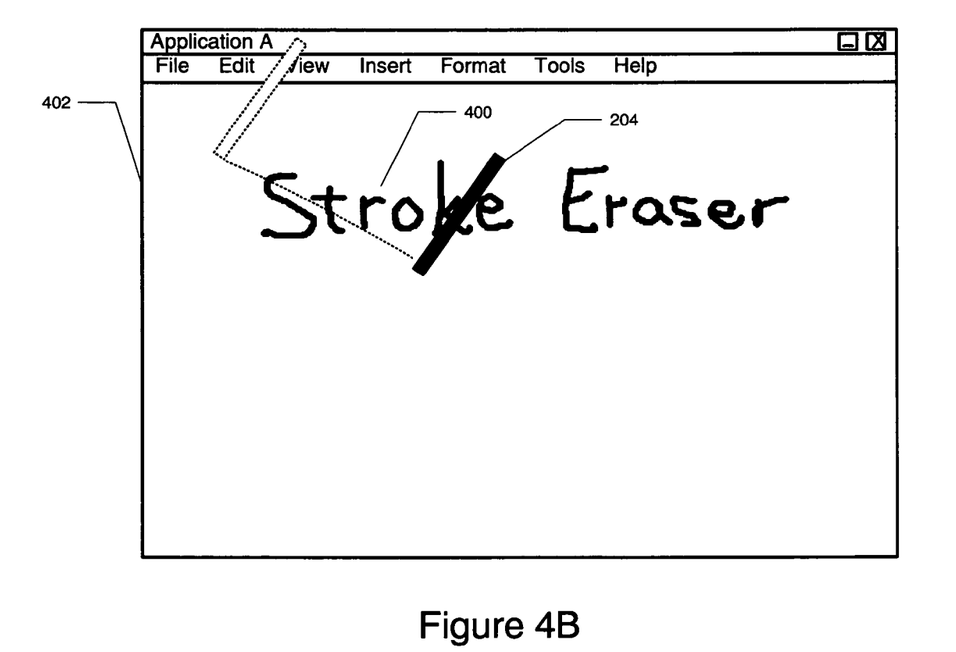
Figure 4C:
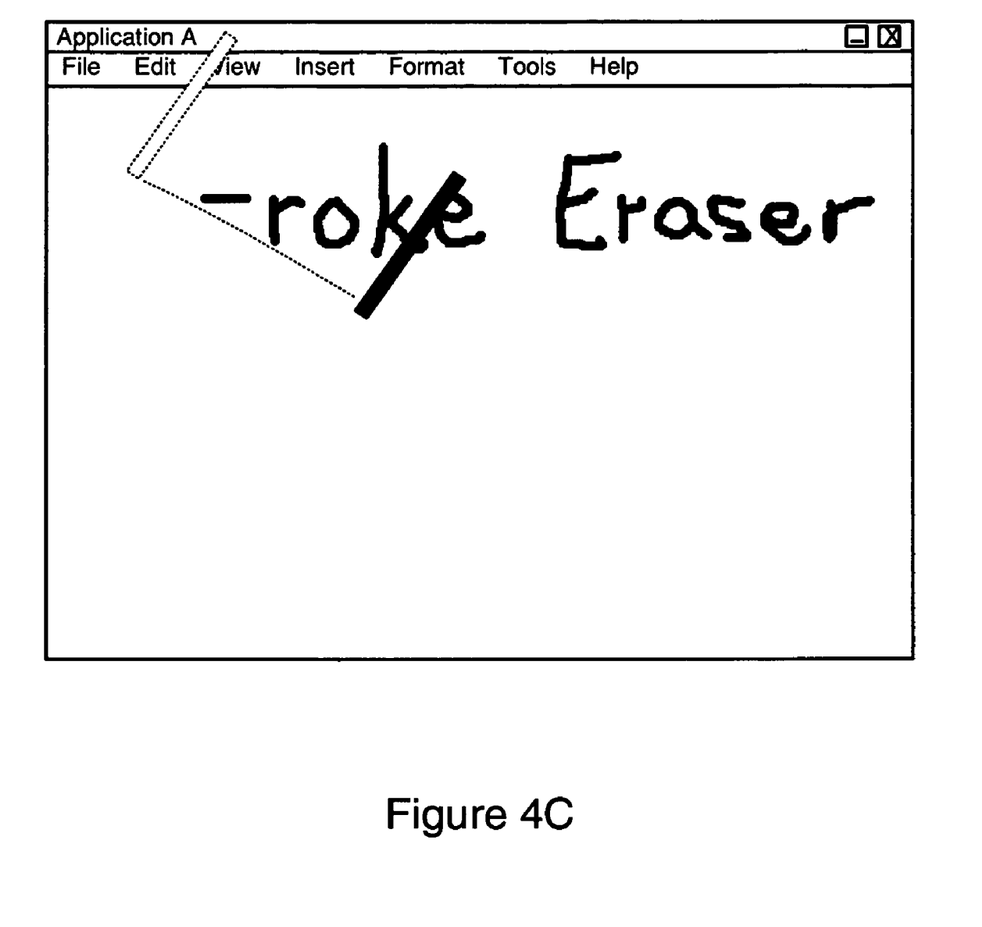

FIG. 4A depicts a sample of electronic ink 400 as it may appear on a user interface 402 and used in conjunction with a stroke eraser. As light pressure is applied via the electronic pen 204, the pixels of the entire stroke within the area contacted by the eraser will be erased. As seen in FIGS. 4B and 4C, light pressure is applied by the eraser to remove the entire stroke of the letter "S" and the vertical portion of the letter "t." Although the eraser area did not cover the entire stroke, the pixels of the entire stroke were changed to a background color. Notably, in this example, the eraser path was close to, but did not contact, the horizontal stroke of the letter "t" and the vertical stroke of the letter "r."

Figure 4D:
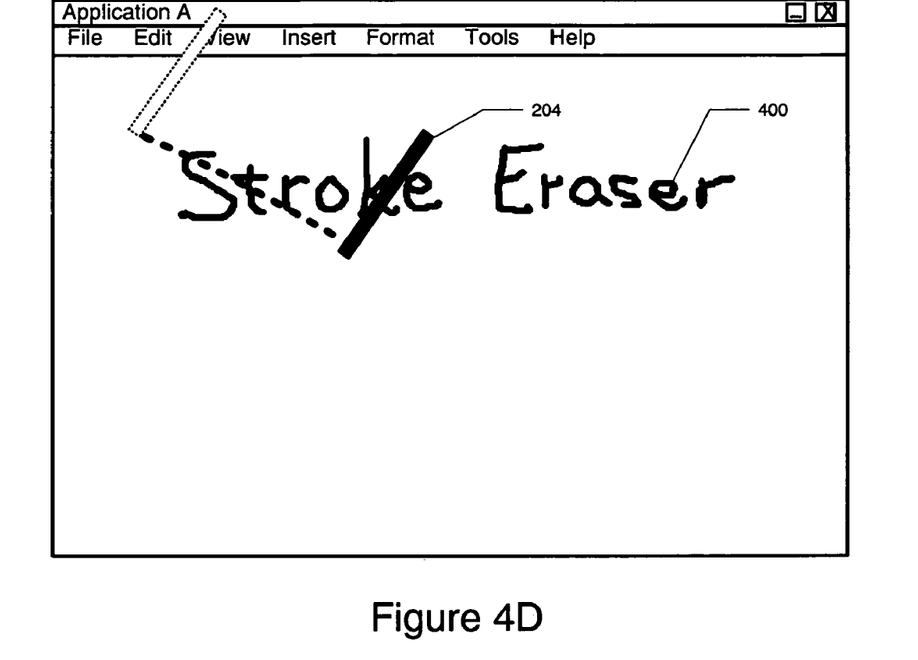
Figure 4E:
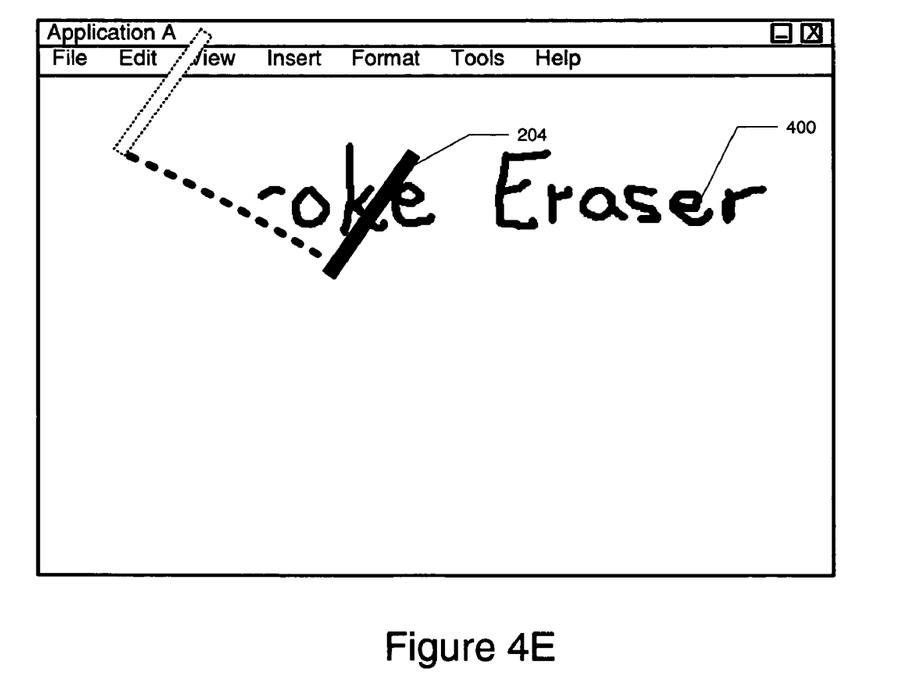

In FIGS. 4D and 4E, higher pressure is applied to remove a wider portion of electronic ink 400 (e.g., to provide a larger eraser width and/or eraser contact path). In this example, essentially the same eraser stroke is performed as in FIG. 4B, however, additional pressure increases the eraser width and erases additional ink. As is seen in FIG. 4E, the same stroke as in FIG. 4B deleted the pixels of the entire stroke of the letter "S," the entire stroke of both portions of the letter "t" and the vertical portion of the letter "r."

Methods used for measuring the force applied to the display surface by the eraser may be any of those generally known in the art (e.g., as used for measuring pressure in applying electronic ink to a digitizer). For instance, the electronic pen may include a plunger element that may help transmit the erasing pressure into the pen structure and to a pressure sensor. In another example, the pen may have a contact member that performs a similar function to that of the plunger element. In yet another example, pressure may be sensed by the digitizer. Such pressure measuring systems generally are known in the art.

In order to gauge the width of the eraser swath that should be used, e.g., the amount of pressure that corresponds to each erasing path width to be erased, the user may have to perform an initial setup procedure, at least in some examples of the invention. For instance, prior to initial use of the pressure eraser system, a user may be requested to provide input corresponding to the amount of pressure that will correspond to the different widths to be erased. Such procedures may include, for example, the user applying a certain amount of pressure to the display and assigning an eraser width to that amount of pressure. The user may repeat this procedure until all available eraser widths are associated with a certain amount of pressure applied by the user. In another example, the user may be asked to press as hard as possible on the display surface. This will provide the maximum pressure value to correspond to the maximum eraser width. The various sizes of the eraser may then be interpolated based on a scale from zero to the maximum pressure value.

These initial setup procedures will allow the pressure eraser system to be customized to the various amounts of pressure that a particular user may apply. In other examples, systems and methods according to the invention may automatically assign various eraser widths to certain incident pressures, e.g., based on initially sensed pressures associated with a user's input.

The eraser system of the present invention may also include a maximum pressure limit. Once the user applies the maximum amount of pressure, any additional pressure will not result in a wider eraser swath. Instead, the swath will remain the width associated with the maximum pressure limit. A minimum eraser width also may be assigned as a low pressure threshold without departing from the invention.

A calibration procedure may also be performed for the size variant pressure erase system. This procedure may be necessary, for example, due to differences in hardware, such as different manufacturers of tablet PCs, pressure sensors and electronic pens. Such calibration may include determining the minimum amount of pressure necessary to erase a given amount of text for that particular computer system. In addition, the maximum pressure for that particular computer system may also need to be determined. Such calibration procedures may be performed by the manufacturer prior to sale of the system or by the user as needed (e.g., as part of an initial set up routine).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

I claim:

1. A method of removing electronic ink from a display, comprising:
   receiving user input indicating an ink erasure action, wherein the user input includes contacting a stylus with a digitizer;
   determining a contact pressure between the stylus and the digitizer;
   setting an eraser width based, at least in part, on the contact pressure, the eraser width customized to an amount of pressure specified by a particular user, the customization based on an initial setup including receiving an initial user input at a plurality of contact pressures and associating each contact pressure with a corresponding eraser width for the particular user; and
   erasing an electronic ink stroke, the electronic ink stroke having at least one pixel in contact with the eraser width, and not erasing any electronic ink strokes not having at least one pixel of the electronic ink stroke in contact with the eraser width.

2. The method of claim 1, further comprising: changing a pixel color of any pixel at a location corresponding to an eraser path along the digitizer to a background color.

3. The method of claim 1, further comprising: changing a pixel color of all pixels within a stroke at a location corresponding to an eraser path along the digitizer to a background color.

4. The method of claim 1, further comprising: changing the eraser width in response to a change in the contact pressure between the stylus and the digitizer.

5. The method of claim 4, wherein the change in eraser width due to the change in contact pressure is proportional to the increase in pressure.

6. The method of claim 5, further comprising a maximum pressure at which additional pressure will maintain a maximum eraser width.

7. The method of claim 6, wherein the eraser width remains constant at a constant pressure.

8. A method of removing electronic ink from a display, comprising:
   performing an initial setup to customize eraser widths for a user based in part on contact pressure specified by the user, the initial setup includes at least one of receiving an initial user input at a plurality of contact pressures and associating each contact pressure with a corresponding eraser width or receiving an initial user input associated with a maximum contact pressure and determining various eraser widths based on the maximum contact pressure;
   receiving a first user input, wherein the first user input comprises first pressure information;
      identifying a first removal area, wherein a size of the first removal area is defined by the first pressure information and the initial setup and wherein any pixel of the electronic ink in contact with the first removal area is erased and wherein any pixel outside of the first removal area is not erased;
   receiving a second user input, wherein the second user input comprises a second pressure information; and
   modifying the size of the first removal area based on the second pressure information and the initial setup.

9. The method of claim 8, wherein the second pressure input is greater than the first pressure input.

10. The method of claim 8, further comprising a first eraser position and a second eraser position.

11. The method of claim 10, further comprising: changing a pixel color of any pixel at a location along an eraser path between the first eraser position and the second eraser position to a background color.

12. The method of claim 10, further comprising changing a pixel color of all pixels within a stroke at a location along an eraser path between the first eraser position and the second eraser position to a background color.

13. The method of claim 8, wherein the size of the first removal area changes proportionally with changing pressure input.

14. The method of claim 8, wherein the user input is received via an electronic pen.

15. The method of claim 8, further comprising, performing a calibration procedure that includes determining a minimum amount of pressure necessary to erase a given amount of text for a particular computer system.

16. The method of claim 8, further comprising, assigning at least one of a maximum pressure limit associated with a maximum eraser width or a minimum pressure limit associated with a minimum eraser width.

17. The method of claim 8, wherein the second pressure information comprises a maximum force.

18. A method of removing electronic ink, comprising:
performing an initial setup including receiving a first user input associated with a user at a plurality of contact pressures and associating each contact pressure with a corresponding eraser width for the user;
receiving at least one electronic ink stroke;
receiving a second user input from the user indicating an ink erasure action, wherein the user input includes contacting a stylus with a digitizer;
determining a contact pressure associated with the second user input between the stylus and the digitizer; and
setting an eraser width based in part on a corresponding eraser width associated with the contact pressure as determined in the initial setup.

19. The method of claim 18, wherein performing the initial setup includes associating increasingly larger eraser widths with increasingly higher contact pressures.

20. The method of claim 18, wherein performing the initial setup includes identifying a maximum contact pressure at which any contact pressure in excess of the maximum contact pressure does not result in an increase in eraser width.

* * * * *